Patented Oct. 7, 1941

2,258,319

UNITED STATES PATENT OFFICE 2,258,319

METHOD FOR THE CONTROL OF JAPANESE BEETLE

Samson R. Dutky, Moorestown, N. J., assignor to Claude R. Wickard, as Secretary of Agriculture of United States of America, and his successors in office No Drawing. Application March 15, 1940, Serial No. 324,097

2 Claims. (Cl. 167—13)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

My invention relates to an insecticide whose essential active ingredient is the resistant stages of bacteria of the group consisting of *Bacillus popilliae, Bacillus lentimorbus* and related forms which produce a condition known as milky disease in the larval forms of insects of the group consisting of *Popillia japonica, Ochrosidia borealis, Strigoderma arboricola, Strigodermella pygmaea, Autoserica castanea,* and *Phyllophaga* spp.

I have found that when these insects are permitted to feed in soil to which the resistant stages of the above-named bacteria have been added that they develop a condition known as milky disease which retards and restricts the development of these insects and eventually kills them. I have found further that when these bacteria are introduced into soil under conditions existing in the field that a similar action occurs.

I will describe herein the preparation of a composition of matter which comprises an inert powdered material such as talc, chalk, marble flour, or materials of similar nature, and the resistant stages of these bacteria. The whole is suitably dried and ground to produce a substantially uniform stable insecticide which can be suitably diluted with water or with solid diluents. This insecticide is effective in killing the larval stages of the above-named insects when applied on the ground or worked into the soil.

In the preparation of my insecticidal composition I proceed as follows: Diseased larvae showing a condition known as milky disease, and containing large numbers of the spores of the above-mentioned bacteria, preferably obtained by the method outlined for propagating these bacteria in quantity, are washed with water to free them from foreign matter, and the excess water is drained off the larvae. The larvae are then crushed by grinding them in a meat chopper. After all the larvae have been run through the chopper, the chopper is washed out with a small amount of water to remove the adhering larval material. The resulting suspension together with the wash water run through the chopper is placed in a graduate and made up to even volume. Counts are made on this suspension by means of a counting chamber using suitable dilution (1:2,000) and the density in spores per cc. is recorded.

The standardized spore suspension is then mixed with the inert powdered material (marble flour, limestone flour, precipitated chalk, or talc) 325 mesh or finer in such proportion that the mixture will contain a billion spores per gram of the inert powdered material. The moist mixture is then further mixed by running it through a mixing device such as a blade cutter or trowel mixer. After a uniform dispersion of the ingredients has been accomplished, the moist material is passed through a high speed impeller type blower which shears the agglomerated particles. It is then dried by drawing heated air through the blower and exposing the finely divided particles to the warm air blast. This material when dry is the stable concentrated insecticidal preparation.

The concentrate can then be diluted with water for use as an insecticidal spray, or with a solid diluent and applied directly on the ground or mixed with the soil. Although I have described a specific method of procedure, my invention is not limited to the details set forth, nor to any particular kind of carrier or diluent or source of the infective bacteria, being broadly the incorporation of the resistant stages of bacteria of milky disease in a suitable carrier to produce an insecticidal composition of matter.

Having thus described my invention, what I claim for Letters Patent is:

1. A method for the control of Japanese beetle, which comprises disseminating in the soil the resistant stages of *Bacillus popilliae*.

2. A method for the control of Japanese beetle, which comprises disseminating in the soil the resistant stages of *Bacillus lentimorbus*.

SAMSON R. DUTKY.